United States Patent
Leith et al.

(10) Patent No.: US 7,394,762 B2
(45) Date of Patent: Jul. 1, 2008

(54) CONGESTION CONTROL IN DATA NETWORKS

(75) Inventors: Douglas Leith, Dublin (IE); Robert N. Shorten, Dublin (IE)

(73) Assignee: National University of Ireland Maynooth, Kildare (IE)

( * ) Notice: Subject to any disclaimer, the term of this patent is extended or adjusted under 35 U.S.C. 154(b) by 834 days.

(21) Appl. No.: 10/829,105

(22) Filed: Apr. 21, 2004

(65) Prior Publication Data

US 2005/0237929 A1 Oct. 27, 2005

(51) Int. Cl.
*G01R 31/08* (2006.01)
*G06F 11/00* (2006.01)
(52) U.S. Cl. .................. 370/229; 370/235
(58) Field of Classification Search ......... 370/229–231, 370/233–236; 725/93, 96
See application file for complete search history.

(56) References Cited

OTHER PUBLICATIONS

Sally Floyd, Mark Handley and Jitendra Padhye, "A Comparison of Equation-Based and AIMD Congestion Control", ACIRI, May 12, 2000, pp. 1-4☐☐.*
M. Allman, V. Paxson and W. Stevens, "TCP Congestion Control", Apr. 1999, The Internet Society (1999), p. 2.*
Dang-Hai Hoang and Dietrich Reschke, "TCP-friendly Exponential Congestion Control for Multimedia Communication", 2002, IEEE, p. 1589☐☐.*
Wang, Ren, et als., "TCP Startup Performance in Large Bandwidth Delay Networks," Computer Science Department, University of California, Los Angeles, CA 90095. 2004.

* cited by examiner

*Primary Examiner*—Chirag G Shah
*Assistant Examiner*—Ashley L Shivers
(74) *Attorney, Agent, or Firm*—Foley Hoag LLP

(57) ABSTRACT

Disclosed are methods of congestion control in transmission of data in packets over a network link using a transport layer protocol, and transmission methods and protocol systems to implement such methods. The number of unacknowledged packets in transit is less than or equal to a congestion window value $cwnd_i$ which can be varied according to an additive-increase multiplicative-decrease (AIMD) law having an increase parameter $\alpha_i$. In embodiments, $\alpha_i$ can be increased during each congestion epoch at a time after the start of a congestion epoch, or based on time since the start of a congestion epoch. In embodiments, a multiplicative decrease parameter $\beta_i$ can be set based on a characteristic(s) of a data flow(s) carried over the network link. For example, the value of $\beta_i$ may be set as the value of the round-trip time of data traversing the link or based on the minimum of the mean inter-packet time.

12 Claims, 3 Drawing Sheets

CONGESTION CONTROL IN DATA NETWORKS

BACKGROUND

1. Field

The disclosed methods and systems relate to congestion control in data networks. It has particular but not exclusive application to networks upon which data is communicated using a transport layer protocol that is a modification of and is compatible with the standard transmission control protocol (TCP).

2. Description of Relevant Art

A problem in the design of networks is the development of congestion control algorithms. Congestion control algorithms are deployed for two principal reasons: to ensure avoidance of network congestion collapse, and to ensure a degree of network fairness. Put simply, network fairness refers to the situation whereby a data source receives a fair share of available bandwidth, whereas congestion collapse refers to the situation whereby an increase in network load results in a decrease of useful work done by the network (usually due to retransmission of data).

Note that in this context "fairness" of access to a network does not necessarily mean equality of access. Instead, it means a level of access appropriate to the device in question. Therefore, it may be deemed fair to provide a high-speed device with a greater level of access to a channel than a slow channel because this will make better use of the capacity of the channel.

Past attempts to deal with network congestion resulted in the widely applied transmission control protocol. While the current TCP congestion control algorithm has proved remarkably durable, it is likely to be less effective on forthcoming networks that will feature gigabit-speed links and small buffer sizes. It may also be less effective where data is transmitted over long distances and comprises heterogeneous traffic originating from heterogeneous sources. These considerations have led to widespread acceptance that new congestion control algorithms must be developed to accompany the development of networking systems.

The task of developing such algorithms is not straightforward. In addition to the requirements discussed above, fundamental requirements of congestion control algorithms include efficient use of bandwidth, fair allocation of bandwidth among sources and that the network should be responsive rapidly to reallocate bandwidth as required. These requirements must be met while respecting key constraints including decentralized design (TCP sources have restricted information available to them), scalability (the qualitative properties of networks employing congestion control algorithms should be independent of the size of the network and of a wide variety of network conditions) and suitable backward compatibility with conventional TCP sources.

To place the disclosed methods and systems in context, the existing TCP network model will now be described. The TCP standard defines a variable cwnd that is called the "congestion window". This variable determines the number of unacknowledged packets that can be in transit at any time; that is, the number of packets in the 'pipe' formed by the links and buffers in a transmission path. When the window size is exhausted, the source must wait for an acknowledgement (ACK) before sending a new packet. Congestion control is achieved by dynamically varying cwnd according to an additive-increase multiplicative-decrease (AIMD) law. The aim is for a source to probe the network gently for spare capacity and back-off its send rate rapidly when congestion is detected. A cycle that involves an increase and a subsequent back-off is termed a "congestion epoch". The second part is referred to as the "recovery phase".

In the congestion-avoidance phase, when a source i receives an ACK packet, it increments its window size $cwnd_i$ according to the additive increase law:

$$cwnd_i \rightarrow cwnd_i + \alpha_i/cwnd_i \quad (1)$$

where $\alpha_i=1$ for standard TCP. Consequently, the source gradually ramps up its congestion window as the number of packets successfully transmitted grows. By keeping track of the ACK packets received, the source can infer when packets have been lost en route to the destination. Upon detecting such a loss, the source enters the fast recovery phase. The lost packets are retransmitted and the window size $cwnd_i$ of source i is reduced according to:

$$cwnd_i \rightarrow \beta_i cwnd_i, \quad (2)$$

where $\beta_i=0.5$ for standard TCP. It is assumed that multiple drops within a single round-trip time lead to a single back-off action. When receipt of the retransmitted lost packets is eventually confirmed by the destination, the source re-enters the congestion avoidance phase, adjusting its window size according to equation (1). In summary, on detecting a dropped packet (which the algorithm assumes is an indication of congestion on the network), the TCP source reduces its send rate. It then begins to gradually increase the send rate again, probing for available bandwidth. A typical window evolution is depicted in FIG. 1 ($cwnd_i$ at the time of detecting congestion is denoted by $w_i$ in FIG. 1).

Over the kth congestion epoch three important events can be discerned from FIG. 1. (A congestion epoch is defined here as a sequence of additive increases ending with one multiplicative decrease of cwnd.) These are indicated by $t_a(k)$; $t_b(k)$ and $t_c(k)$ in FIG. 1. The time $t_a(k)$ is the time at which the number of unacknowledged packets in the pipe equals $\beta_i w_i(k)$. $t_b(k)$ is the time at which the pipe is full so that any packets subsequently added will be dropped at the congested queue. $t_c(k)$ is the time at which packet drop is detected by the sources. Time is measured in units of round-trip time (RTT). RTT is the time taken between a source sending a packet and receiving the corresponding acknowledgement, assuming no packet drop. Equation 1 corresponds to an increase in $cwnd_i$ of $\alpha_i$ packets per RTT.

The foregoing discussion relates to AIMD sources where the increase and decrease parameters $\alpha_i$ and $\beta_i$ are constant (although they may differ for each source). A number of recent proposals for high-speed networks vary the rate of increase and decrease as functions of window size or other values. The approach is readily extended to these protocols by extending the model to include time varying parameters $\alpha_i(k)$ and $\beta_i(k)$ and defining the model increase parameter to be an effective value, for example such that $$\alpha_i(k)=(w_i(k+1)-\beta_i w_i(k))/(t_c(k)-t_a(k))$$

The current TCP congestion control algorithm described above may be inefficient on modern high-speed and long distance networks. On such links, the window sizes can be very large (perhaps tens of thousands of packets). Following a congestion event, the window size is halved and subsequently only increased by one packet per round-trip time. Thus, it can take a substantial time for the window size to recover, during which time the send rate is well below the capacity of the link. One possible solution is to simply make the TCP increase parameter $\alpha_i$ larger, thereby decreasing the time to recover following a congestion event and improving the responsiveness of the TCP flow. Unfortunately, this direct solution is inadmissible because of the requirement on lower speed networks for backward compatibility and fairness with existing TCP traffic. The requirement is thus for $\alpha_i$ to be large in high-speed networks but unity in low-speed ones, naturally leading to consideration of some form of mode switch. However, mode switching creates the potential for introducing undesirable dynamic behaviors in otherwise well behaved systems and any re-design of TCP therefore needs to be carried out with due regard to such issues.

SUMMARY

An aim of the disclosed methods and systems is to provide a protocol that improves upon TCP in high-speed networks while maintaining compatibility with existing systems.

From a first aspect, the disclosed methods and systems provide a method of congestion control in transmission of data in packets over a network link using a transport layer protocol, wherein: a) the number of unacknowledged packets in transit in the link is less than or equal to a congestion window value $cwnd_i$ for the ith flow; b) the value of $cwnd_i$ is varied according to an additive-increase multiplicative-decrease (AIMD) law having an increase parameter $\alpha_i$, and the value of $\alpha_i$ is increased during each congestion epoch.

The method effectively operates in two modes during a congestion epoch. Initially, it operates in a low-speed mode that is compatible with conventional TCP. After the value of $\alpha_i$ is increased it operates in a high-speed mode in which it takes better advantage of a high-speed link than can conventional TCP. The initial compatibility with TCP ensures proper operation of the system in a network that includes both high-speed and low-speed data sources.

The value of may $\alpha_i$ increase at a fixed time after the start of each congestion epoch, for example as a fixed multiple of the round-trip time for a data packet to travel over the network link. As a development of this arrangement, the value of $\alpha_i$ may increase at a plurality of fixed times after the start of each congestion epoch. In this case, each fixed time may be calculated as a respective fixed multiple of the round-trip time for a data packet to travel over the network link.

Alternatively, the value of $\alpha_i$ may increase as a function of time from the start of a congestion epoch, for example, as a polynomial function of time from the start of a congestion epoch.

In embodiments, the value of $\alpha_i$ is unity at the start of each congestion epoch to ensure compatibility with standard TCP.

As a particular example, in a method embodying the disclosed methods and systems, upon detection of network congestion during a kth congestion epoch at a time when the value of $cwnd_i$ is $w_i(k)$, the value of $cwnd_i$ becomes $\beta_i w_i(k) - \delta$ where $\delta = 0$ initially and $\delta_i = \beta_i(\alpha_i^H - \alpha_i^L)$ after an increase in the value of $\alpha_i$.

The disclosed methods and systems also provide a method of transmitting data in packets over a network link and a networking component for transmitting data in packets over a network link that employ congestion control as defined above.

From another aspect, the disclosed methods and systems provide a method of congestion control in transmission of data in packets over a network link using a transport layer protocol, wherein:
  a) the number of unacknowledged packets in transit in the link is less than or equal to a congestion window value $cwnd_i$ for the ith flow;
  b) the value of $cwnd_i$ is varied according to an additive-increase multiplicative-decrease (AIMD) law having a multiplicative decrease parameter $\beta_i$, and
  c) the value of $\beta_i$ is set as a function of one or more characteristics of one or more data flows carried over the network link.

This provides an adaptive backoff that can further enhance the effectiveness of congestion control by way of the disclosed methods and systems.

In such embodiments, the value of $\beta_i$ is typically set as a function of the round-trip time of data traversing the link. For example, in cases in which the link carries a plurality of data flows, there is a round-trip time $RTT_i$ associated with the ith data flow sharing the link, the shortest round-trip time being designated $RTT_{min,i}$ and the greatest round-trip time being designated $RTT_{max,i}$, the value of $\beta_i$ may be set as $$\beta_i = \frac{RTT_{\min,i}}{RTT_{\max,i}}.$$

This may be on-going during transmission, such that the values of $RTT_{min,i}$ and $RTT_{max,i}$ are monitored and the value of $$\beta_i = \frac{RTT_{\min,i}}{RTT_{\max,i}}$$

is re-evaluated periodically.

To ensure fairness of access, the additive-increase parameter $\alpha_i$ may be varied as a function of $\beta_i$. In some embodiments, of particular preference, and to ensure fair access to high-speed and conventional sources, $\alpha_i$ may be varied as $\alpha_i = 2(1-\beta_i)$.

Advantageously, the value of round-trip times of one or more data flows carried over the network link are monitored periodically during transmission of data and the value of $\beta_i$ is adjusted in accordance with updated round-trip values thereby determined.

The value of $\beta_i$ may be set as a function of the mean inter-packet time of data flowing in the link or the mean throughput.

The disclosed methods and systems also provide a method of congestion control in which the value of $\beta_i$ is set by:
  a) during data transmission, periodically monitoring the value of the mean inter-packet time IPTmin,i or throughput of the i'th flow;
  b) upon the measured value of IPTmin,i moving outside of a threshold band, resetting the value of $\beta_i$ to $\beta_{breset,i}$ (typically 0.5); and
  c) upon IPTmin,i or throughput returning within the threshold band, setting $$\beta_i = \frac{RTT_{\min,i}}{RTT_{\max,i}}$$

and periodically resetting $\beta_i$ in response to changes in the value of RTTmin,i or RTTmax,i.

Further features that may be included in embodiments of the disclosed methods and systems will become apparent from the description that will be presented below.

DESCRIPTION

Figure 1:
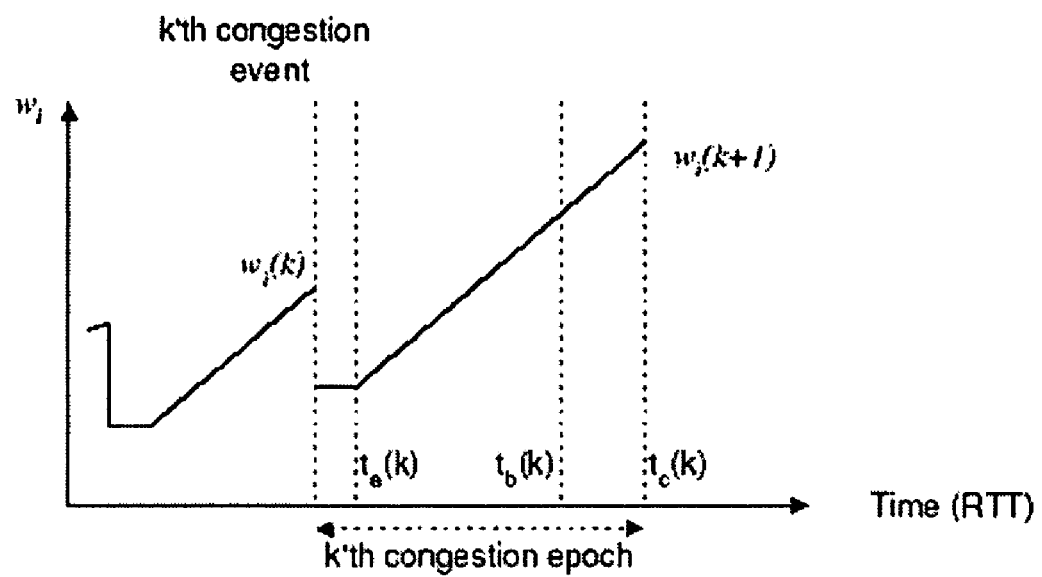
FIG. 1 is a graph illustrating the evolution of the congestion window (cwind$_i$) in conventional TCP, and has already been discussed.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Embodiments of the disclosed methods and systems will now be described in detail, by way of example only, and with reference to the accompanying drawings.

A note on the issue of network convergence and fair allocation of network bandwidth will now be presented in order that the workings of the disclosed methods and systems can be better understood.

Let $\alpha_i = \lambda(1-\beta_i) \forall i$ and for some $\lambda > 0$. Then $W_{ss}^T = \Theta/n[1, 1, \ldots, 1]$; that is, $w_1 = w_2 = \ldots = w_n$, where n is the number of network sources. For networks where the queuing delay is small relative to the propagation delay, the send rate is essentially proportional to the window size. In this case, it can be seen that $\alpha_i = \lambda(1-\beta_i) \forall i \in \{1, \ldots, n\}$ is a condition for a fair allocation of network bandwidth. For the standard TCP choices of $\alpha_i = 1$ and $\beta_i = 0.5$, we have $\lambda = 2$ and the condition for other AIMD flows to co-exist fairly with TCP is that they satisfy $\alpha_i = 2(1-\beta_i)$; see FIG. 2 for an example of the co-existence of two TCP sources with different increase and decrease parameters. (NS simulation, network parameters: 10 Mb bottleneck link, 100 ms delay, queue 40 packets). The network convergence, measured in number of congestion epochs, depends on the values of $\beta_i$.

The protocol provided by this embodiment can be considered to be an adaptation of TCP to include a high-speed mode and a low-speed mode. In the high-speed mode, the increase parameter of source i is $\alpha_i^H$ and in the low-speed mode $\alpha_i^L$. Upon congestion, the protocol backs off to $\beta_i w_i(k) - \delta_i$, with $\delta_i = 0$ in low-speed mode and $\delta_i = \beta_i(\alpha_i^H - \alpha_i^L)$ in high-speed mode. This ensures that the combined initial window size $$\sum_{i=1}^{n} (\beta w_i(k) - \delta_i)$$

following a congestion event is the same regardless of the source modes before congestion.

Figure 2:
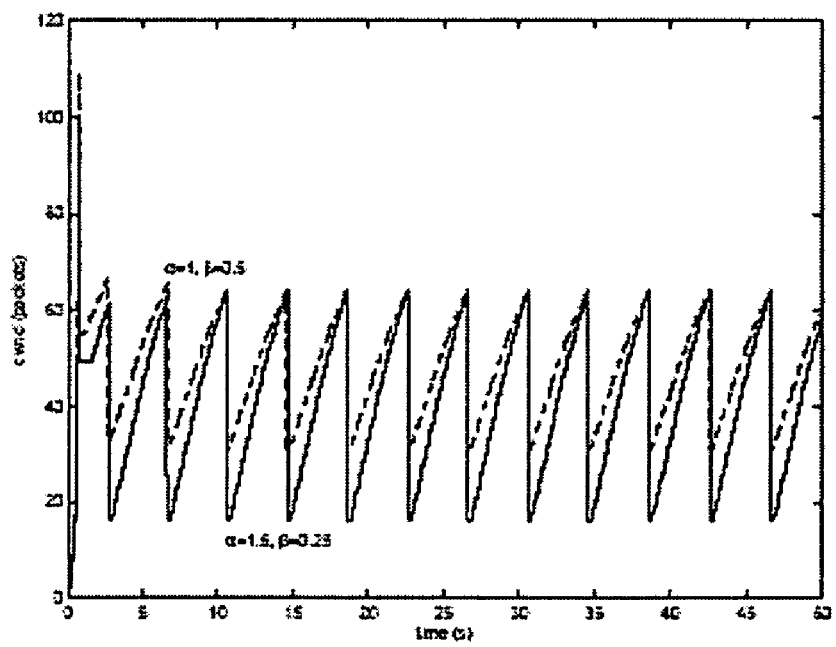
FIG. 2 is a graph illustrating the evolution of the congestion window (cwind$_i$) for two flows in which the flows have unequal increase and decrease parameters $\alpha_i$, $\beta_i$ which satisfy the relation $\alpha_i = 2(1-\beta_i)$.
Figure 3:
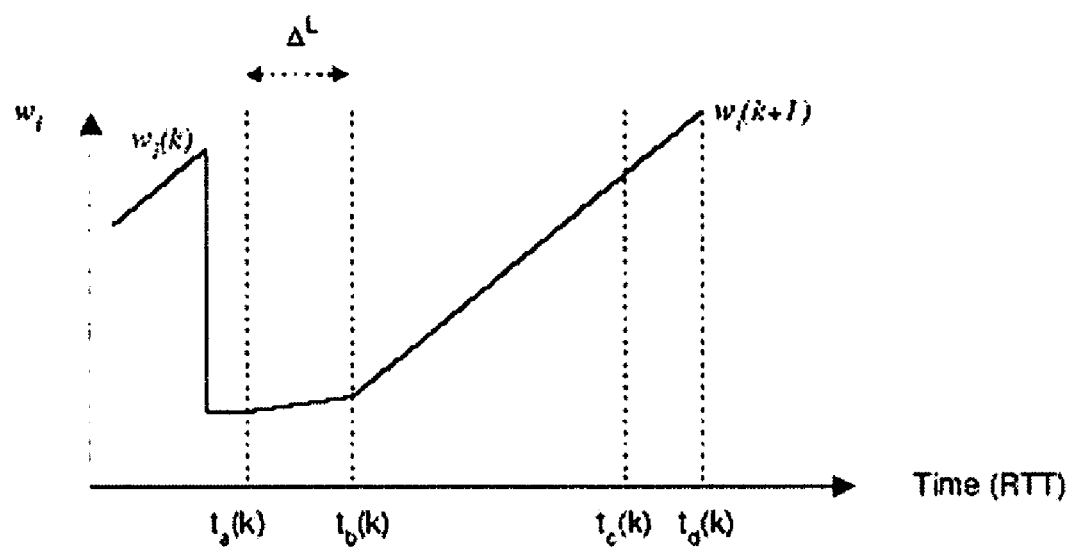
FIG. 3 is a graph illustrating the evolution of the congestion window (cwind$_i$) in an embodiment of the disclosed methods and systems.

The mode switch is governed by $$\alpha_i = \begin{cases} \alpha_i^L cwnd_i - (\beta_i w_i(k) - \delta_i) \leq \Delta^L \\ \alpha_i^H cwnd_i - (\beta_i w_i(k) - \delta_i) > \Delta^L \end{cases} \quad (3)$$

where cwnd$_i$ is the current congestion window size of the ith TCP source $\beta_i w_i(k) - \delta_i$, is the size of the congestion window immediately after the last congestion event, $\alpha_i^L$ is the increase parameter for the low-speed regime (unity for backward compatibility), $\alpha_i^H$ is the increase parameter for the high-speed regime, $\beta_i$ is the decrease parameter as in conventional TCP, and $\Delta^L$ is the threshold for switching from the low to high speed regimes. This strategy is referred to as H-TCP and a typical congestion epoch is illustrated in FIG. 2.

It should be noted in the scheme for high-speed networks a mode switch takes place in every congestion epoch. Moreover, the strategy (4) leads to a symmetric network; that is, one where the effective $\alpha_i$ and $\beta_i$ are the same for all H-TCP sources experiencing the same duration of congestion epoch.

The strategy is motivated by and realizes several design criteria as will now be described.

Sources deploying H-TCP should behave as a normal TCP-source when operating on low-speed communication links. Such behavior is guaranteed by (4) since the protocol tests the low-speed or high-speed status of the network every congestion epoch.

Normal AIMD sources competing for bandwidth should be guaranteed some (small) share of the available bandwidth.

H-TCP sources competing against each other should receive a fair share of the bandwidth. This is guaranteed using the symmetry arguments presented above. H-TCP sources should be responsive. Again, this is guaranteed using symmetry and an appropriate value of $\beta_i$ combined with a value of $\alpha_i$ that ensures that the congestion epochs are of suitably short duration.

Embodiments of the disclosed methods and systems can be developed further in various ways.

First, the strategy can be developed to include several mode switches.

The threshold $\Delta^L$ may be adjusted to reflect the absolute time in seconds since the last congestion event, or the number of RTTs since the last congestion event (RTT being the round-trip time, as described above).

During the high-speed mode, $\alpha_i$ may be adjusted in a continuous rather than switched manner. In particular, $\alpha_i$ may be varied as a polynomial function of RTT or elapsed time since last congestion event. For example, in accordance with:

$$\alpha_i^H = 1 + 10(\Delta_i - \Delta^L) + \left(\frac{\Delta_i - \Delta^L}{2}\right)^2, \quad (4)$$

where $\Delta$ is elapsed time in seconds or RTTs since the last congestion event. Note that when a continuous update law is used it is possible to set $\delta_i=0$ in the high-speed mode.

Note that in all of the above cases, the convergence and fairness results of the first-described embodiment apply directly.

Figure 4:
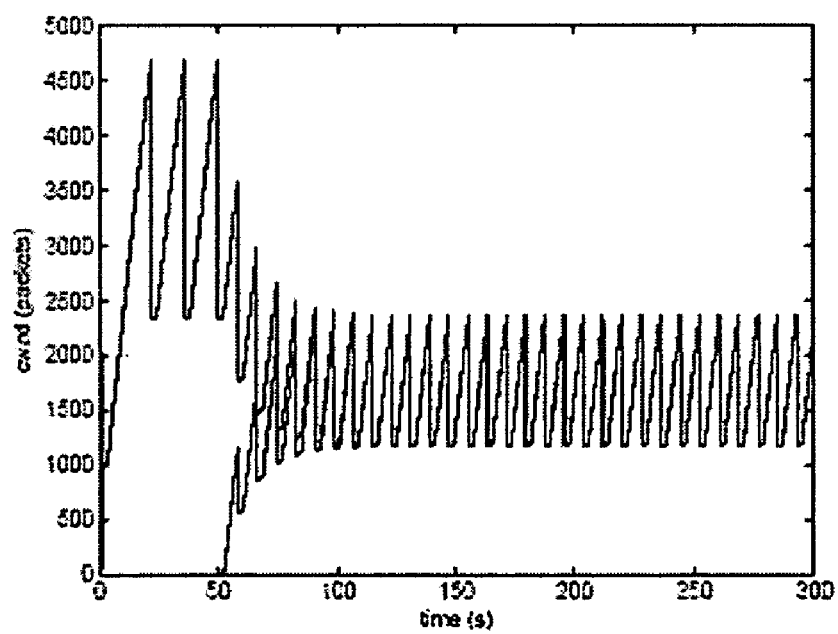
FIG. 4 is a graph illustrating the evolution of the congestion window (cwind$_i$) for two flows in a high-speed link in an embodiment of the disclosed methods and systems.
Figure 5:
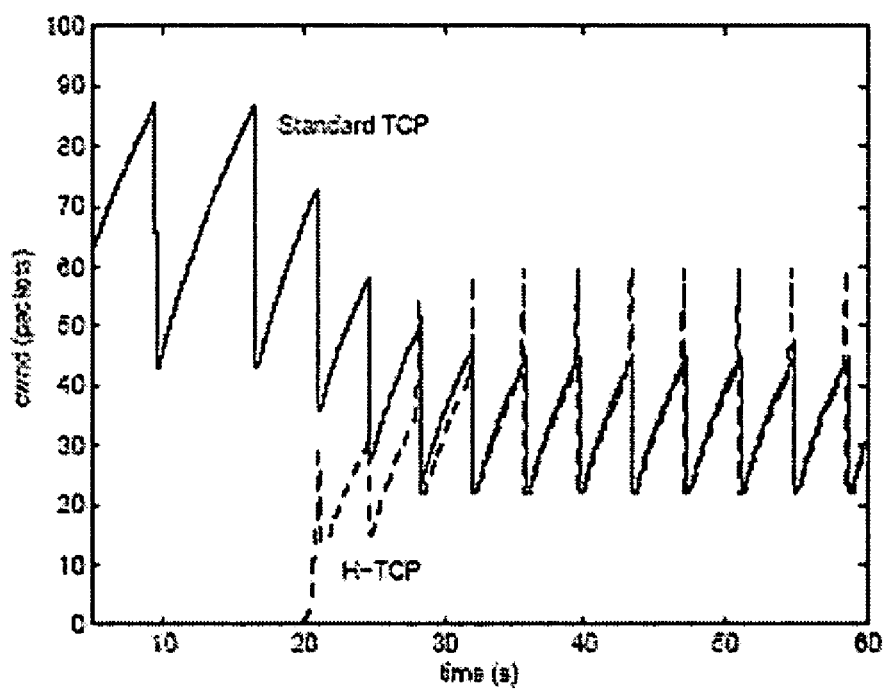
FIG. 5 is a graph illustrating the evolution of the congestion window (cwind$_i$) for two flows in a low-speed link in an embodiment of the disclosed methods and systems; and, FIG. 6 is a block diagram of an adaptive congestion and control scheme embodying the disclosed methods and systems.

The performance of this high-speed algorithm is illustrated in FIG. 4 using an NS packet-level simulation. Two high-speed flows with the same increase and decrease parameters are shown. As expected, the stationary solution is fair. It can be seen that convergence is rapid, taking approximately four congestion epochs which is in agreement with the rise time analysis for $\beta_i=0.5$.

An important consideration in the design of embodiments of the disclosed methods and systems is backward compatibility. That is, when deployed in low-speed networks, H-TCP sources should co-exist fairly with sources deploying standard TCP ($\alpha=1$; $\beta=0.5$). This requirement introduces the constraint that $\alpha_i^L=1$; $\beta_i=0.5$. When the duration of the congestion epochs is less than $\Delta^L$, the effective increase parameter for high-speed sources is unity and the fixed point is fair when a mixture of standard and high-speed flows co-exist. When the duration of the congestion epochs exceeds $\Delta^L$, the network stationary point may be unfair. The degree of unfairness depends on the amounts by which the congestion epochs exceed $\Delta^L$, with a gradual degradation of network fairness as the congestion epoch increases. An example of this is illustrated in FIG. 4.

In this example, two H-TCP flows show rapid convergence to fairness. The second flow experiences a drop early in slow-start, focusing attention on the responsiveness of the congestion avoidance algorithm (NS simulation, network parameters: 500 Mb bottleneck link, 100 ms delay, queue 500 packets; TCP parameters: $\alpha^L=1$; $\alpha^H=20$; $\beta_i=0.5$; $\Delta^L=19$ corresponding to a window size threshold of 38 packets).

As has been discussed, in standard TCP congestion control the AIMD parameters are set as follows: $\alpha_i=1$ and $\beta_i=0:5$. These choices are reasonable when the maximum queue size in the bottleneck buffer is equal to the delay-bandwidth product, and backing off by a half should allow the buffer to just empty. However, it is generally impractical to provision a network in this way when, for example, each flow sharing a common bottleneck link has a different round-trip time. Moreover, in high-speed networks, large high-speed buffers are problematic for technical and cost reasons. The solution is an adaptive backoff mechanism that exploits the following observation.

At congestion the network bottleneck is operating at link capacity and the total data throughput through the link is given by:

$$R(k)^- = \frac{\sum_i^n w_i(k)}{RTT_{max,i}} = \frac{\sum_i^n w_i(k)}{T_{di} + \frac{q_{max}}{B}}, \quad (5)$$

where B is the link capacity, n is the number of network sources, $q_{max}$ is the bottleneck buffer size and where $T_{di}$ is a fixed delay. After backoff, the data throughput through the link is given by:

$$R(k)^+ = \frac{\sum_i^n \beta_i w_i(k)}{RTT_{min,i}} = \frac{\sum_i^n \beta_i w_i(k)}{T_{d_i}}, \quad (6)$$

under the assumption that the bottleneck buffer empties. Clearly, if the sources backoff too much, data throughput will suffer. A simple method to ensure maximum throughput is to equate both rates yielding the following (non-unique) choice of $\beta_i$:

$$\beta_i = \frac{T_{di}}{T_{di} + \frac{q_{max}}{B}} = \frac{RTT_{min,i}}{RTT_{max,i}}. \quad (7)$$

Based on the above, observation embodiments of the disclosed methods and systems can provide an adaptive strategy under which the provisioning of each TCP flow is estimated on-line and the backoff factor set such that the throughput on a per-flow basis is matched before and after backoff. In ideal circumstances this should ensure that the buffer just empties following congestion and the link remains operating at capacity. The parameters required for such an adaptive mechanism can be obtained at each flow by measuring the maximum and minimum round-trip time. Since it is known that:

$$RTT_{min,i} = T_{di},$$

$$RTT_{max,i} = \frac{q_{max}}{B} + T_{di},$$

then the multiplicative backoff factor $\beta_i$ that ensures efficient use of the link is:

$$\beta_i = \frac{RTT_{min,i}}{RTT_{max,i}}.$$

Alternatively, this ratio can be expressed as:

$$\beta_i(k+1) = \beta_i(k) \frac{B_{max}^i(k)}{B_{min}^i(k)} \quad (8)$$

$$= \frac{T_{di}}{T_{di} + \frac{q}{B}} \quad (9)$$

$$= \frac{RTT_{min,i}}{RTT_{max,i}} \quad (10)$$

where $B_{max}^i(k)$ is the throughput of flow i immediately before the kth congestion event, and $B_{min}^i(k)$ is the throughput of flow i immediately after the kth congestion event. This avoids the need to measure $RTT_{max,i}$ directly. Note that it is, in many cases, important to maintain fairness: by setting $$\beta_i = \frac{RTT_{min,i}}{RTT_{max,i}}$$

a corresponding adjustment of $\alpha_i$ is required. Both network fairness and compatibility with TCP are ensured by adjusting $\alpha_i$ according to $\alpha_i=2(1-\beta_i)$.

In summary, the adaptive backoff mechanism operates at a source as follows:

1. Determine initial estimates of $RTT_{min,i}$ and $RTT_{max,i}$ by probing during the slow start phase;
2. Set the multiplicative backoff factor $\beta_i$ as the ratio of $RTT_{min,i}$ to $RTT_{max,i}$;
3. Adjust the corresponding additive increase parameter $\alpha_i$ according to $\alpha_i=2(1-\beta_i)$; and
4. Monitor continuously the relative values of $RTT_{max,i}$ and $RTT_{min,i}$ to check for dynamic changes in the link provisioning.

Note that the above strategy may be implemented by measuring the RTT values directly, or indirectly as indicated in equation 8.

Embodiments of the disclosed methods and systems may also adapt to promote responsiveness.

The ratio $$\frac{RTT_{min,i}}{RTT_{max,i}}$$

may approach unity on under-provisioned links. However values of $\beta_i$ close to unity will give slow convergence after a disturbance (e.g. traffic joining or leaving the route associated with the link, see examples below). It follows that a further adaptive mechanism is desirable which continuously adjusts the trade-off between network responsiveness and efficient link utilization. This requires a network quantity that changes predictably during disturbances and that can be used to trigger an adaptive reset. One variable that does this is the minimum of the mean inter-packet time ($IPT_{min,i}$), where the mean is taken over a round-trip time period. Another variable is the mean throughput. The $IPT_{min,i}$ is a measure of the link bandwidth allocated to a particular flow. This in turn is determined by the link service rate B (which is assumed to be constant), the number of flows and the distribution of bandwidth among the flows. Thus as new flows join, the $IPT_{min,i}$ for an existing flow can be expected to increase. On the other hand, the value of $IPT_{min,i}$ will decrease when the traffic decreases. Thus, by monitoring $IPT_{min,i}$ for changes it is possible to detect points at which the flows need to be adjusted and reset $\beta_i$ to some suitable low value for a time.

In summary, an adaptive reset algorithm embodying the disclosed methods and systems can proceed as follows:

(i) continually monitor the value of $IPT_{min,i}$ or the mean throughput;
(ii) when the measured value of $IPT_{min,i}$ or the mean throughput moves outside of a threshold band, reset the value of $\beta_i$ to $\beta_{reset,i}$; and,
(iii) once $IPT_{min,i}$ or the mean throughput returns within the threshold band (e.g. after convergence to a new steady state, which might be calculated from $\beta_{reset,i}$), re-enable the adaptive backoff algorithm $$\beta_i = \frac{RTT_{min,i}}{RTT_{max,i}}.$$

Figure 6:
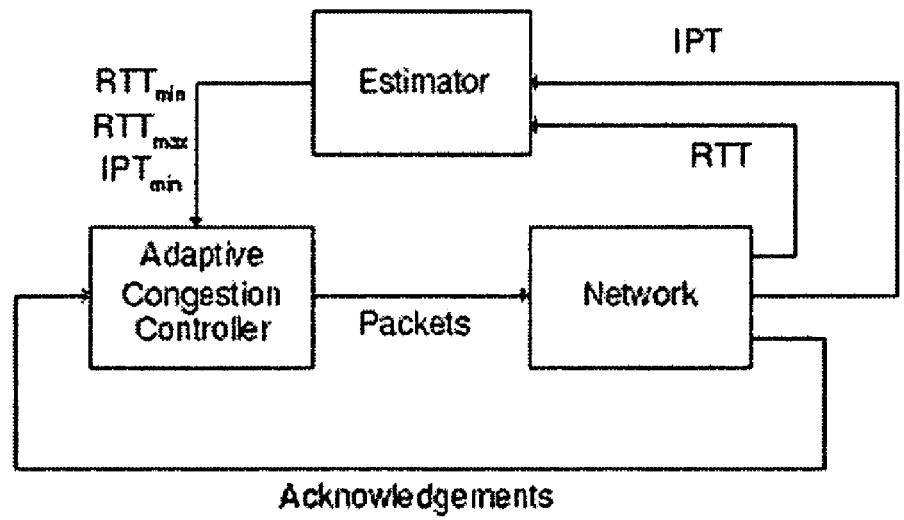

The two adaptive mechanisms (backoff and reset) present in an embodiment of the disclosed methods are shown schematically in FIG. 6.

Note that as previously discussed, this strategy can be implemented indirectly using $B_{max}^i(k)$ as in Equation 8, above.

It will be clear to a person skilled in the technology of computer networking that protocols embodying the disclosed methods and systems can readily be implemented in a software component. For example, this can be done by modification of an existing implementation of the transmission control protocol (TCP). Networking components embodying the disclosed methods and systems may implement variation in either or both of the values of $\alpha_i$ and $\beta_i$ as described above. Such a component can form an addition to or a replacement of a transport layer networking component in an existing or in a new computer operating system.

What is claimed is:

1. A method of congestion control in transmission of data in packets over a network link using a transport layer protocol, wherein
   a number of unacknowledged packets in transit in the link is less than or equal to a congestion window value $cwnd_i$; comprising:
   a) varying the value of $cwnd_i$ according to an additive-increase multiplicative-decrease (AIMD) law having rate of increase parameter $\alpha_i$,
   b) increasing the value of $\alpha_i$ during each congestion epoch,
   c) responsive to detection of network congestion during a kth congestion epoch at a time when the value of $cwnd_i$ is $w_i(k)$, setting the value of $cwnd_i$ to $\beta_i w_i(k)-\delta$ where $\beta_i$ is the multiplicative-decrease parameter and $\delta=0$ initially and $\delta_i=\beta_i(\alpha_i^H-\alpha_i^L)$ after an increase in the value of and $\alpha_i$, and
   d) transmitting packets over the network link in accordance with the value of $cwnd_i$ set in step c).

2. A method of congestion control according to claim 1, further comprising increasing the value of $\alpha_i$ at a fixed time after the start of each congestion epoch.

3. A method of congestion control according to claim 2 further comprising calculating the fixed time as a fixed multiple of the round-trip time for a data packet to travel over the network link.

4. A method of congestion control according to claim 1 further comprising increasing the value of $\alpha_i$ at a plurality of fixed times after the start of each congestion epoch.

5. A method of congestion control according to claim 4 further comprising calculating each fixed time as a respective fixed multiple of the round-trip time for a data packet to travel over the network link.

6. A method of congestion control according to claim 1 further comprising setting the value of $\alpha_i$ to unity at the start of each congestion epoch.

7. A method of congestion control according to claim 1 comprising increasing $\alpha_i$ as a polynomial function of time from the start of a congestion epoch.

8. A method according to claim 1, further comprising during each congestion epoch, at a time prior to increase in the value of $\alpha_i$, implementing transport control protocol (TCP) having standard congestion control.

9. A method of congestion control in transmission of data in packets over a network link using a transport layer protocol to transmit a plurality of data flows on the link there being a respective round-trip time $RTT_i$ associated with the ith data flow sharing the link, $RTT_i$ being the interval between a networking component placing a packet on the network link and its receiving an acknowledgement of receipt of the packet, the shortest round-trip time being designated $RTT_{min,i}$ and the greatest round-trip time being designated $RTT_{max,i}$ wherein:
  a number of unacknowledged packets in transit in the link is less than or equal to a congestion window value $cwnd_i$;
comprising:
  a) varying the value of cwnd according to an additive-increase multiplicative-decrease (AIMD) law having a multiplicative decrease parameter $\beta_i$,
  b) setting the value of $\beta_i$ as $$\beta_i = \frac{RTT_{min,i}}{RTT_{max,i}},$$

and
  c) transmitting packets over the network link in accordance with the value of $cwnd_i$.

10. A method of congestion control according to claim 9 further comprising monitoring the values of $RTT_{min,i}$ and $RTT_{max,i}$ and re-evaluating the value of $$\beta_i = \frac{RTT_{min,i}}{RTT_{max,i}}$$

periodically.

11. A method of congestion control according to claim 9 in which the additive-increase multiplicative-decrease law has rate of increase parameter $\alpha_i$, and comprising varying $\alpha_i$ as a function of $\beta_i$.

12. A method of congestion control according to claim 11 further comprising varying $\alpha_i$ as $\alpha_i = 2(1-\beta_i)$.

* * * * *